No. 644,330. Patented Feb. 27, 1900.
J. W. PACKARD.
ELECTRICAL MEASURING INSTRUMENT.
(Application filed Jan. 12, 1900.)

(No Model.) 2 Sheets—Sheet 1.

Witnesses
Jas. E. Hutchinson.
C. W. Clement.

Inventor
James W. Packard
By Watson & Watson
Attorneys

No. 644,330. Patented Feb. 27, 1900.
J. W. PACKARD.
ELECTRICAL MEASURING INSTRUMENT.
(Application filed Jan. 12, 1900.)
(No Model.) 2 Sheets—Sheet 2.
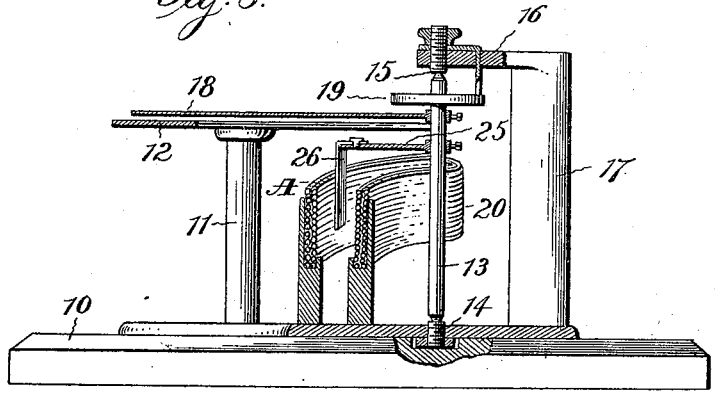
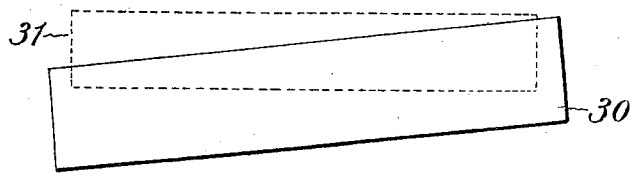
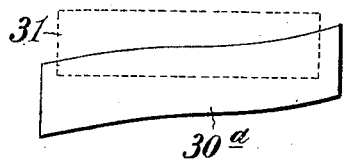
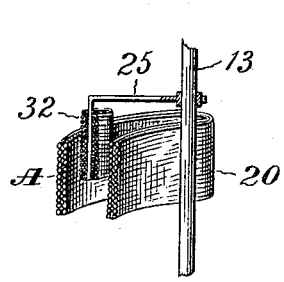
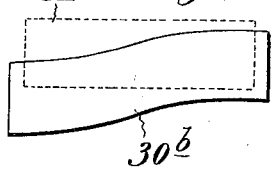
Witnesses
Jas. E. Hutchinson.
E. W. Clement.
Inventor
James W. Packard
By Watson & Watson
Attorneys

UNITED STATES PATENT OFFICE.

JAMES W. PACKARD, OF WARREN, OHIO.

ELECTRICAL MEASURING INSTRUMENT.

SPECIFICATION forming part of Letters Patent No. 644,330, dated February 27, 1900.

Application filed January 12, 1900. Serial No. 1,245. (No model.)

*To all whom it may concern:*

Be it known that I, JAMES W. PACKARD, a citizen of the United States, residing at Warren, in the county of Trumbull and State of Ohio, have invented certain new and useful Improvements in Electrical Measuring Instruments, of which the following is a specification.

This improved electrical measuring instrument is adapted for the measurement of either current or potential and in a modified form it may be used to measure power—that is, it is adapted for use in its various forms as an ammeter, voltmeter, and wattmeter.

Figure 1:
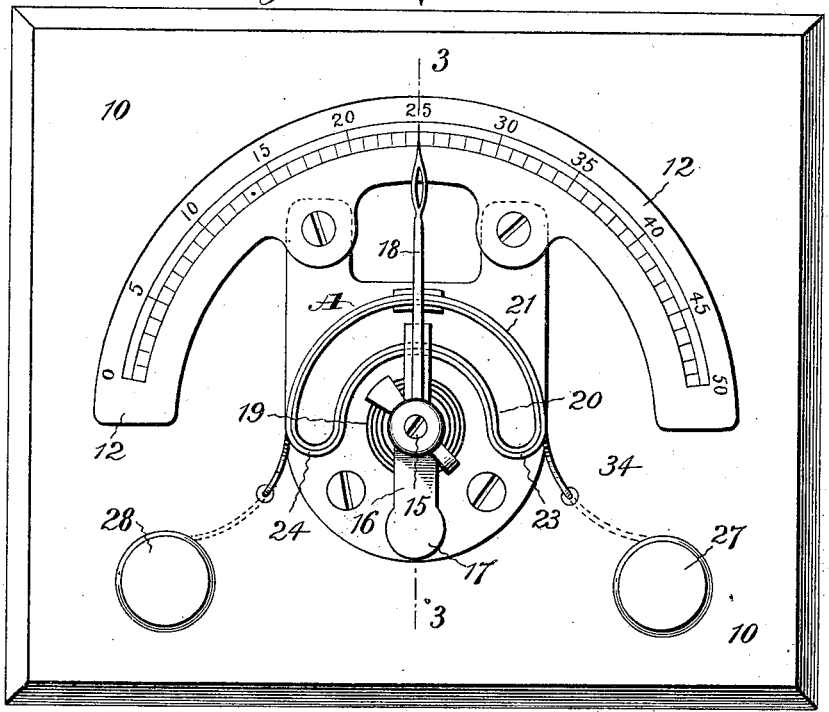
Figure 2:
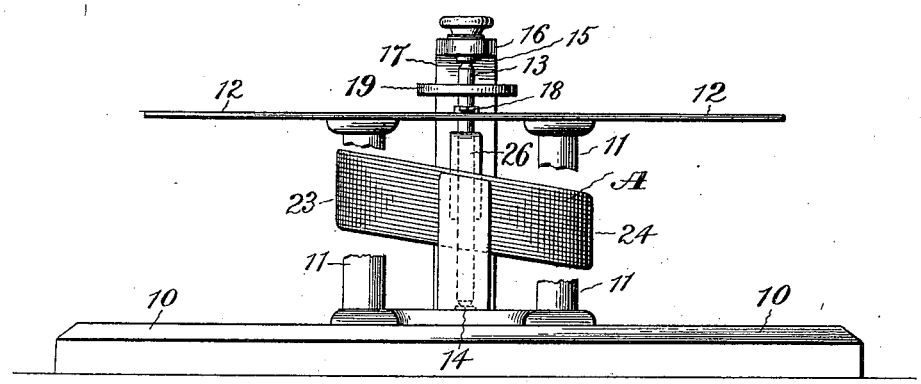

Referring to the drawings, Figure 1 is a plan view of the instrument adapted for use as an ammeter or voltmeter. Fig. 2 is a front view of the same looking in the direction of the arrow 2, Fig. 1. Fig. 3 is a section on the line 3 3, Fig. 1. Fig. 4 is a diagram illustrating a development of the coil in full lines and the path of the core in dotted lines. Fig. 5 is a view similar to Fig. 3, but showing the instrument adapted for use as a wattmeter; and Figs. 6 and 7 are views similar to Fig. 4, but illustrating modifications.

One object of the present invention is to produce a measuring instrument of simple construction which shall have a large range of movement and be sensitive throughout said movement to slight changes in current or potential.

Another object is to produce an instrument in which, if desired, the scale may be divided into equal parts throughout, representing equal increments in current or potential. In some cases it may be desirable to have the instrument more sensitive at certain portions of the travel of the index than at other portions. This may be accomplished in my invention by very simple means, which will be hereinafter described.

Referring to Figs. 1, 2, and 3 of the drawings, 10 indicates a suitable base upon which the various parts of the device are mounted. On suitable supports 11 is carried a circular scale 12. Concentric with the scale is an indicator-shaft 13, mounted in suitable bearings 14 15, the lower bearing being supported on the base and the upper bearing on the arm 16 of a standard or post 17. The shaft 13 carries a pointer or indicator 18, which indicator is normally held at the zero-point on the scale by a spiral spring 19, having one end connected to the shaft and the other end to the arm 16.

The parts of the apparatus just described are common to instruments of this class and will be readily understood.

The solenoid A has its coil flattened, the opposing walls 20 21 being parallel and concentric with the shaft 13, as best shown in Fig. 1, the coil being bent sharply at 23 and 24. For convenience the parts 23 24 will be termed the "ends" of the coil. As shown in Figs. 2 and 3, the coil is distorted vertically as well as horizontally, being arranged spirally about the indicator-shaft. The walls or branches 20 21 of the solenoid are arranged within the same angle as the scale and are practically coextensive in angular measurement with the scale, as shown in Fig. 1. In said figure the coil and scale occupy nearly one hundred and eighty degrees; but they may measure more or less angularly, as desired. The walls of the coil gradually rise from one end 24 to the opposite end 23, the increase in elevation being uniform for each degree of the scale. The indicator-shaft has an arm 25, upon which is mounted a core 26, said core in Figs. 1 to 3, inclusive, being in the form of a vertical plate adapted to travel in the space between the walls of the solenoid. The core normally stands at the lower end of the solenoid and as current is passed through the coil it tends to draw the core axially into it in accordance with a well-known law. It will be seen that the core can pass into the coil only by rotating about the indicator-shaft, and the attractive force of the coil is thus utilized to give the indicator-shaft a rotary movement. The amount of rotation will vary with the force of the current passing through the coil and also with the angularity of the coil in a vertical plane. Each instrument can be nicely adjusted to its scale by simply adjusting the angle of inclination of the coil. As shown, the coil is connected to binding-posts 27 28.

In Fig. 4, 30 indicates the development of the coil in diagram, and 31 indicates the path of the core 26. It will be evident from this figure that the horizontal component of the force of the solenoid tends to draw the core to the right and that this horizontal component depends upon the inclination of the coil.

In the diagram Fig. 4 the solenoid 30 rises uniformly from end to end and the horizontal component developed by it is the same throughout the travel of the core 31. In some instances it is desirable that the units of the scale should be larger at one portion than at another in order to indicate variations of current or potential with greater delicacy at a given portion of a scale. This may be accomplished by suitably varying the inclination of the solenoid. Thus, as shown in the diagram Fig. 6 the solenoid 30ª is given greater inclination at its ends and less at its middle than the solenoid 30 in Fig. 4. This will cause the index to travel more slowly toward the end of the solenoid and more rapidly at its middle portion for a given increment in current or potential. In such case the scale should be varied accordingly, the units at the middle of the scale being longer than at its ends. In the diagram Fig. 7 this condition is reversed, the solenoid 30ᵇ having its greatest inclination at the middle, which would render it necessary to make the units of the scale shorter at the middle than at the ends.

From the foregoing description it will be evident that I may arrange a scale for any special purpose having its units of equal or unequal length, as desired, by simply varying the inclination of the solenoid at different points. This is one of the valuable features of the present invention.

In Fig. 5 is shown an embodiment of the invention adapted for use as a wattmeter. This device is the same as that illustrated in Figs. 1 to 3, inclusive, with the exception that a small coil 32 is substituted for the core 26. Coil 32 is included in a shunt of the main circuit.

The term "core" as used in the claims will be understood to include either the solid, metal core 26, the shunt-coil, or any equivalent devices.

Having described my invention, what I claim, and desire to secure by Letters Patent, is—

1. An electrical measuring instrument, comprising in combination a core adapted to revolve about an axis, and a flattened solenoid-coil arranged spirally about said axis, said core standing normally at one end of the coil, and being adapted to move toward the other end of the coil under the influence of said solenoid when energized.

2. An electrical measuring instrument, comprising in combination a scale, an indicator, an indicator-shaft, means for normally holding the indicator at zero on the scale, a solenoid-core carried by said indicator-shaft, and a solenoid having a flattened coil, the opposite walls of said coil being circular and concentric with the indicator-shaft and inclined to a plane at right angles to said shaft, said core being adapted to travel between the walls of the coil, for the purpose set forth.

3. An electrical measuring instrument, comprising in combination a scale, an indicator, an indicator-shaft, a flattened solenoid-coil arranged spirally about said shaft, and a shunt-coil carried by said shaft and adapted to travel between the walls of the solenoid-coil, for the purpose set forth.

4. An electrical measuring instrument, comprising, in combination, a scale, an indicator, an indicator-shaft, a solenoid-core carried by said indicator-shaft, and a solenoid having a flattened coil, the opposite walls of said coil being circular and concentric with the indicator-shaft, said coil being variably inclined with reference to a plane at right angles to said shaft whereby said core is caused to travel variable distances for equal increments of current or potential.

In testimony whereof I affix my signature in presence of two witnesses.

JAMES W. PACKARD.

Witnesses:
 ROBT. E. GORTON,
 M. S. ANDREWS.